April 16, 1968  A. JENSEN  3,378,733
SUPERVISORY SWITCHING ARRANGEMENT
Filed May 19, 1965

United States Patent Office 3,378,733
Patented Apr. 16, 1968

3,378,733
SUPERVISORY SWITCHING ARRANGEMENT
Arne Jensen, Havnbjerg, Als, Denmark, assignor to Danfoss A/S, Nordborg, Denmark, a corporation of Denmark
Filed May 19, 1965, Ser. No. 457,017
Claims priority, application Germany, May 22, 1964, D 44,538
6 Claims. (Cl. 317—130)

ABSTRACT OF THE DISCLOSURE

A supervisory switching arrangement to detect the presence of a flame. A sensor senses ultraviolet radiation from the flame and is rendered conductive and a solid state gate electrode is rendered conductive thereby. A potential multiplier circuit operates the sensor and a condenser therein discharges through the tube when it is conductive and has such a low value that accurately controlled current through the tube is small so that the life of the sensor is maximized.

Figure 1:
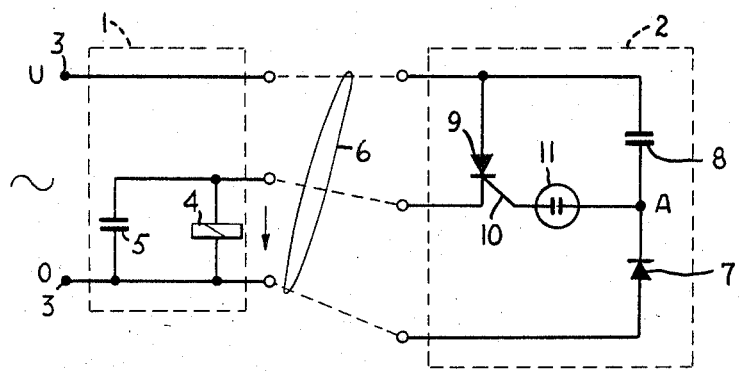

The present invention relates to a supervisory switching arrangement, and more particularly to such a switching arrangement adapted for connection to an alternating current supply source, and utilizing photoelectric elements as a sensing means to determine if an abnormal condition exists.

The present invention is particularly adapted to detect the presence of a flame in oil burners, and preferably uses an ultraviolet radiation sensitive tube, or the like, which controls a relay, preferably a solid state gate controlled switch, which in turn, controls the main operating or power relay.

Ultraviolet radiation sensitive tubes have many advantages as supervisory control sensing elements. However, they require a comparatively high operating voltage as compared to other sensing elements, and they are easily damaged by excessive current through the sensing tube. Thus, difficulty has been experienced by utilizing such ultraviolet radiation sensitive tubes. If on the one hand, a step-up transformer is utilized to operate such tubes from an alternating current supply of from, for example 110 volts, a relative large current will flow through the tube when it becomes conductive upon sensing of a flame. Further, difficulty has been experienced in providing a circuit utilizing such a tube which will disable response of a tube to a flame in case of a short circuit within the controller unit itself.

It is an object of the present invention to provide a control circuit which avoids these difficulties and which permits the use of an ultraviolet tube connected to ordinary line potential, for example in the magnitude of 110 volts.

Briefly, in accordance with the present invention, a potential multiplier circuit utilizing a condenser and a rectifier, as is well known by and itself, is used to operate the ultraviolet tube. Upon conduction of the tube, for example upon sensing of a flame, the condenser discharges through this tube. The value of the condenser can be chosen to be small so that a current through the tube itself will be small and the life of the tube will, therefore, be substantially extended. A very simple circuit can be constructed, in accordance with the present invention, by controlling the gate of a solid state switch, such as a silicon controlled rectifier or silicon controlled switch, by the condenser discharge current through the ultraviolet tube. Effective and positive switching of the silicon controlled switch can then be obtained. The potential multiplier circuit permits the use of tubes having operating potential less than the line potential available, or if the line potential has been decreased, for example by regulation by means of a voltage regulator. The current itself which is passed by the silicon controlled switch, or silicon controlled rectifier, can be substantial and can operate a fairly large power relay for a large oil burner.

Voltage multiplier circuits, as is known, reach their high potential value only at each second half wave of the alternating current supply. Thus, the ultraviolet tube will be effective only each second half wave, and the silicon controlled switch, or SCR will be open only each second half wave. Thus, a rectified current will be obtained which can be utilized to operate a D.C. relay with a shunt condenser.

The gate control switch may be an amplifier in itself, for example a transistor; fast operating time, however, is important, and further the feature that when a short impulse is passed through the gate control switch, its operating condition will not change unless there is a removal or reversal of applied potential. Thus, a silicon controlled rectifier or its bilateral equivalent the silicon controlled switch is preferred. A suitable element is available commercially under type Transitron TSW200C.

Figure 2:
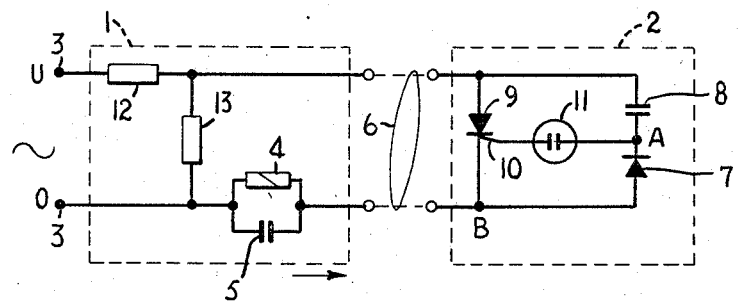

The structure, organization and operation of the invention will now be described more specifically in the following detailed description with reference to the accompanying drawings, in which:

FIG. 1 is a schematic circuit diagram of an oil burner safety control circuit in accordance with the present invention, and utilizing a three conductor cable between control element and sensing head; and FIG. 2 is a circuit diagram of a supervisory control circuit in accordance with the present invention, and utilizing a two conductor interconnecting cable.

Referring now to the drawings, and more particularly to FIG. 1: An oil burner safety control circuit is shown, consisting of two units, a controller unit 1, and a sensing head 2. The two units, controller unit 1 and sensing head 2, are interconnected by a cable 6. The controller unit 1 is provided with a pair of line terminals 3, adapted for connection to an A.C. source U–O. It further includes an operating relay 4, sensitive to direct current, shunted by a condenser 5. Cable 6 is a three terminal cable interconnecting unit 1 with the sensing head 2. One terminal of the cable 6 is directly connected from terminal U of controller 1. The other connection from terminal O is connected to a rectifier 7, in series with a condenser 8, and forming a potential multiplier circuit. A gate controlled switching element, shown as a silicon controlled rectifier 9, is connected to line U and to the center connection of cable 6, which in turn is connected to the free terminal of relay 4 and its parallel connected condenser 5. The gate or control electrode of SCR 9 is connected by means of an ultraviolet detecting tube 11 to the junction point A between condenser 8 and diode 7.

Upon connection of terminals 3 to an alternating current source condenser 8 will be charged at the first negative half period of the A.C. wave. During the following positive half period the potential between junction point A and line O will double since the potential over condenser 8 will add to the potential of the A.C. source. Diode 7 is biased in its conductive direction, and will be triggered when the potential over the ultraviolet detector tube 11 reaches the triggering potential, and radiation to trigger the tube 11 is present. The controlled rectifier 9 is then conductive and relay 4 will operate.

Unfortunately, the potential is not exactly doubled because condenser 5 has to charge in the next following positive half wave, so that the potential across condenser 5 is subtracted from the potential between the points O and A. This potential can be compensated by utilizing a boot strap circuit, as shown in FIG. 2.

Referring now particularly to FIG. 2, a resistor 12 and a voltage dependent resistor 13 are utilized to stabilize the input voltage. The parallel connection of relay 4 and condenser 5 will carry the charging current of the potential multiplication circuit. This has the additional advantage that the cable 6 interconnecting the controller 1 and the sensing head 2 need be only a two terminal cable which need not be polarized.

When the circuit is connected to the A.C. source, condenser 8 will charge during the negative half wave, that is when rectifier 7 is conductive. During the following positive half wave, the condenser potential will be added to the stabilized supply voltage. In the next negative half period the potential which is on the now charged condenser 5 will be added to the supply voltage, and the potential across condenser 8 will be increased by this amount. In the following half wave the potential on condenser 5 and the stabilized supply potential will subtract from the increased voltage across condenser 8. The potential between points A and B, FIG. 2, will therefore, be in the same order of magnitude as immediately after connecting the control circuit. Thus, the ultraviolet radiation sensitive tube 11 will be subject to a very accurately defined potential, and thus the control rectifier 9 will fire at an accurately determinable point. The loading on the tube 11 is very small since it merely discharges over the condenser 8 which can be chosen to have a low value, for example 200 pF. The current through the tube 11 can then be in the order of microamperes, substantially increasing the life of tube 11.

If any of the conductors of cable 6′, which corresponds to cable 6 in FIG. 1, are short circuited, relay 4 which again is a D.C. relay, will not operate; likewise, short circuit of rectifier 7 or the main current path through the line terminals SCR 9 will not cause operation of relay 4.

The ultraviolet radiation sensitive tube 11 will become conductive at each second half wave. It is thus not necessary that the element 9 have rectifying properties; a silicon controlled switch, which is bidirectional is likewise usable.

Various modifications may be made without departing from the inventive concept. The general expression "gate electrode" as applied to the control electrode of SCR 9 has been chosen in connection with the type of element previously referred to, but may apply equally to control electrodes of different controlled elements. The inventive concept is also useful not only with ultraviolet radiation sensitive tubes, but with other sensing elements which have similar difficulties, for example sensing elements responsive to voltage, temperature or pressure.

What is claimed is:

1. A supervisory switching arrangement comprising, a sensor which upon sensing a predetermined condition becomes conductive, a gate controlled element having a gate electrode connected to said sensor to be rendered conductive thereby, a voltage doubler comprising a capacitor and a rectifier in series, said sensor being connected to a point intermediate said capacitor and said rectifier, an alternating current supply source providing a supply voltage, connections from said source to said gate controlled diode and said doubler connecting said doubler across said supply source and connected to effectively render said rectifier conductive each negative half wave of said supply voltage and said capacitor to its potential to said supply voltage each positive half wave and potential across said capacitor is increased a corresponding amount the next following half wave, means connected to said supply source and said voltage doubler to cause the supply voltage to subtract from the increased voltage across said capacitor thereby to accurately determine potential to said sensor and the sensor discharges through said capacitor when rendered conductive, whereby the operating current of said sensor need be only a very reduced current and the operating life of the sensor is maximized.

2. A supervisory switching arrangement according to claim 1, in which the last mentioned means comprises means stabilizing said supply voltage.

3. A supervisory switching arrangement according to claim 1, in which said sensor comprises an ultraviolet radiation sensitive element for sensing the presence of a flame.

4. A supervisory switching arrangement according to claim 3, in which said sensor comprises a tube.

5. A supervisory switching arrangement according to claim 1, in which said gate controlled element comprises a silicon controlled rectifier.

6. A supervisory switching arrangement according to claim 5, including a parallel circuit comprising a relay and a shunting capacitor in series with said rectifier and connected to said supply source.

References Cited

UNITED STATES PATENTS 3,348,104  10/1967  Zielinski et al. _____ 317—149 X

LEE T. HIX, *Primary Examiner.*